(12) United States Patent
Kemmerling et al.

(10) Patent No.: US 10,815,873 B2
(45) Date of Patent: Oct. 27, 2020

(54) METHODS AND SYSTEMS FOR A TWO-STAGE TURBOCHARGER

(71) Applicant: Ford Global Technologies, LLC, Dearborn, MI (US)

(72) Inventors: Joerg Kemmerling, Monschau (DE); Franz Arnd Sommerhoff, Aachen (DE); Helmut Matthias Kindl, Aachen (DE); Michael Forsting, Moenchengladbach (DE); Hanno Friederichs, Aachen (DE); Vanco Smiljanovski, Bedburg (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 658 days.

(21) Appl. No.: 15/639,225

(22) Filed: Jun. 30, 2017

(65) Prior Publication Data
US 2018/0010512 A1    Jan. 11, 2018

(30) Foreign Application Priority Data

Jul. 5, 2016 (DE) .......................... 10 2016 212 249

(51) Int. Cl.
*F02B 37/013* (2006.01)
*F01N 13/14* (2010.01)
(Continued)

(52) U.S. Cl.
CPC .......... *F02B 37/013* (2013.01); *F01N 3/0814* (2013.01); *F01N 3/0842* (2013.01);
(Continued)

(58) Field of Classification Search
CPC .................. F02B 37/004; F02B 37/013; F02B 37/18–186; F01N 13/009; F01N 13/10;
(Continued)

(56) References Cited

U.S. PATENT DOCUMENTS

| 4,404,804 A | * | 9/1983 | Tadokoro | .................. F01N 3/22 60/280 |
| 8,365,519 B2 | | 2/2013 | Wirbeleit et al. | |

(Continued)

FOREIGN PATENT DOCUMENTS

| DE | 19923557 A1 | 11/2000 |
| DE | 102005043060 A1 | 3/2007 |

(Continued)

OTHER PUBLICATIONS

National Intellectual Property Administration of the People's Republic of China, Office Action and Search Report Issued in Application No. 201710535635.5, dated Sep. 10, 2020, 11 pages. (Submitted with Partial Translation).

*Primary Examiner* — Ngoc T Nguyen
(74) *Attorney, Agent, or Firm* — Geoffrey Brumbaugh; McCoy Russell LLP

(57) ABSTRACT

The disclosure relates to a supercharged, direct-injection internal combustion engine having an intake system for the supply of charge air and having an exhaust-gas discharge system for the discharge of exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, a first bypass line being provided which branches off from the exhaust-gas discharge system between the first turbine and the second turbine so as to form a first junction point.

19 Claims, 5 Drawing Sheets

(51) Int. Cl.
*F02D 41/06* (2006.01)
*F01N 13/10* (2010.01)
*F01N 3/08* (2006.01)
*F01N 13/18* (2010.01)
*F02B 37/18* (2006.01)
*F02D 23/02* (2006.01)
*F02D 41/00* (2006.01)
*F02D 41/02* (2006.01)
*F02M 35/10* (2006.01)

(52) U.S. Cl.
CPC ............ *F01N 13/10* (2013.01); *F01N 13/102* (2013.01); *F01N 13/143* (2013.01); *F01N 13/1811* (2013.01); *F02B 37/183* (2013.01); *F02D 23/02* (2013.01); *F02D 41/0007* (2013.01); *F02D 41/0235* (2013.01); *F02D 41/064* (2013.01); *F02M 35/10157* (2013.01); *F01N 2240/20* (2013.01); *F01N 2410/02* (2013.01); *F02D 41/0275* (2013.01); *F02D 2200/021* (2013.01); *Y02T 10/144* (2013.01)

(58) Field of Classification Search
CPC .. F01N 13/102; F01N 13/143; F01N 13/1811; F01N 3/0814; F01N 3/046; F02D 41/0007; F02D 41/0235; F02D 41/064; F02D 23/02
See application file for complete search history.

(56) References Cited

U.S. PATENT DOCUMENTS

| | | | |
|---|---|---|---|
| 8,511,066 B2 | 8/2013 | Harris et al. | |
| 8,671,682 B2 | 3/2014 | Parlow et al. | |
| 9,057,319 B2 | 6/2015 | Joergl et al. | |
| 2004/0109759 A1* | 6/2004 | Korner | F01D 9/026 415/205 |
| 2007/0169479 A1* | 7/2007 | Nicolle | F01N 13/10 60/612 |
| 2009/0158724 A1* | 6/2009 | Muller | F01N 13/102 60/323 |
| 2009/0178406 A1 | 7/2009 | Matthews et al. | |
| 2012/0017587 A1 | 1/2012 | Yoshida et al. | |
| 2012/0255528 A1* | 10/2012 | Gunkel | F01N 13/1811 123/562 |
| 2013/0006494 A1* | 1/2013 | Petrovic | F02D 41/024 701/102 |
| 2013/0255230 A1* | 10/2013 | Takeuchi | F01N 3/36 60/274 |
| 2014/0109553 A1 | 4/2014 | Roberts, Jr. et al. | |
| 2014/0366525 A1* | 12/2014 | Wagner | F02B 37/025 60/598 |
| 2016/0047287 A1* | 2/2016 | Roberts, Jr. | F01N 3/2066 60/274 |

FOREIGN PATENT DOCUMENTS

| | | | |
|---|---|---|---|
| DE | 102009014361 A1 | | 9/2010 |
| DE | 202014102710 U1 | | 7/2014 |
| DE | 102013215574 A1 | | 2/2015 |
| DE | 202015102241 U1 | | 7/2015 |
| DE | 202015103037 U1 | | 8/2015 |
| DE | 102015108896 A1 | * | 12/2016 |
| EP | 1396619 A1 | | 3/2004 |
| EP | 1640596 A1 | | 3/2006 |
| WO | WO-2008048918 A1 | * | 4/2008 ............ F02B 39/00 |
| WO | 2010108574 A1 | | 9/2010 |
| WO | 2013010924 A1 | | 1/2013 |
| WO | WO-2015140210 A1 | * | 9/2015 |

* cited by examiner

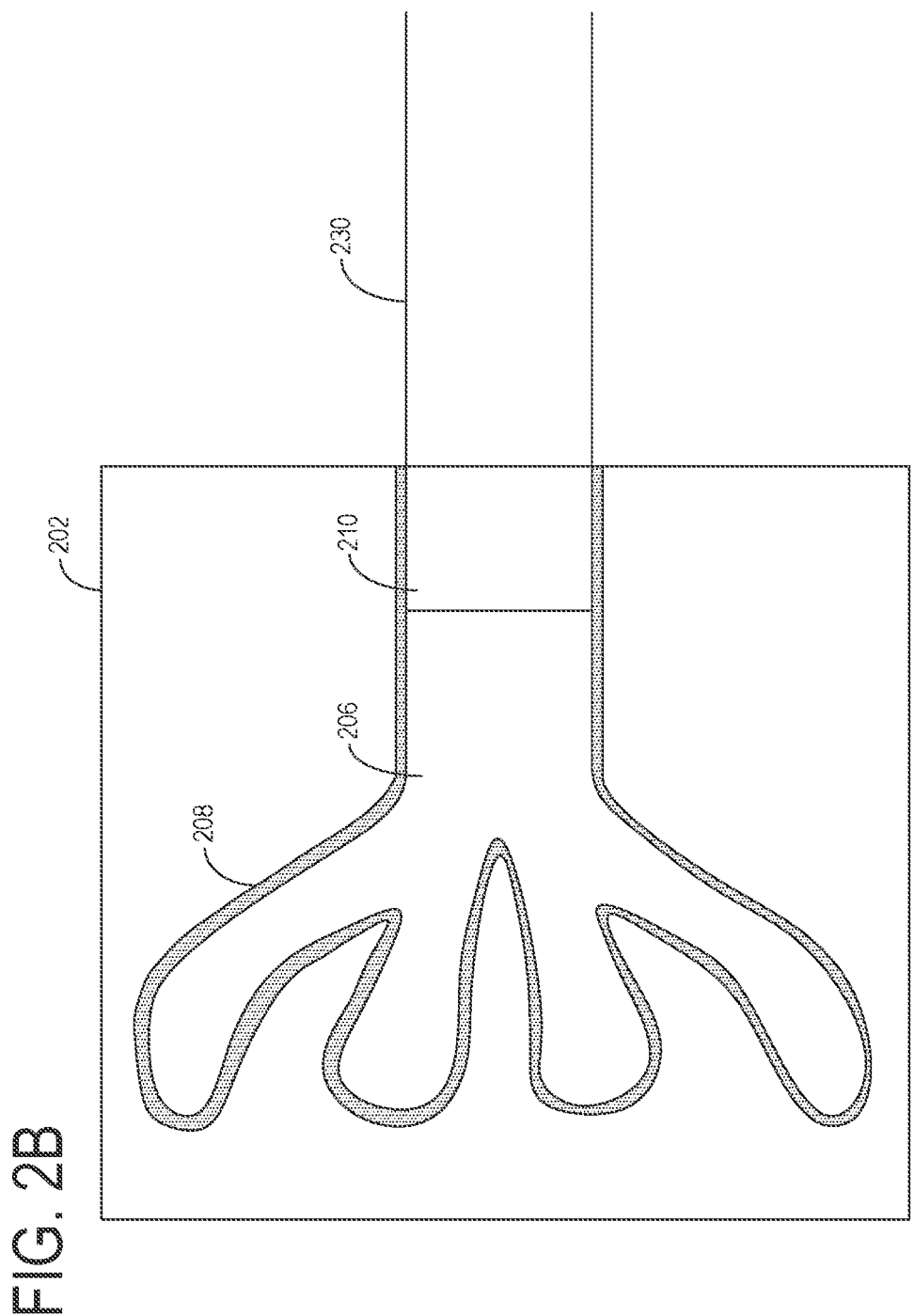

METHODS AND SYSTEMS FOR A TWO-STAGE TURBOCHARGER

RELATED APPLICATIONS

The present application claims priority to German Patent Application No. 102016212249.5, filed Jul. 5, 2016. The entire contents of the above-referenced application are hereby incorporated by reference in their entirety for all purposes.

FIELD

The present description relates generally to a two-stage turbocharger and a method for operating a two-stage turbocharger.

BACKGROUND/SUMMARY

The present disclosure relates to a supercharged, direct-injection internal combustion engine having an intake system for the supply of charge air and having an exhaust-gas discharge system for the discharge of exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage. The second turbine, which comprises a turbine housing, of the second exhaust-gas turbocharger being arranged upstream of the first turbine, which comprises a turbine housing, of the first exhaust-gas turbocharger, and the second compressor of the second exhaust-gas turbocharger being arranged downstream of the first compressor of the first exhaust-gas turbocharger. A first bypass line may be provided which branches off from the exhaust-gas discharge system between the first turbine and the second turbine so as to form a first junction point. A valve is arranged in the exhaust-gas discharge system at the first junction point, a second bypass line being provided which branches off from the exhaust-gas discharge system upstream of the second turbine and which opens into the exhaust-gas discharge system again between the first turbine and the second turbine and in which there is arranged a shut-off element, at least one exhaust-gas aftertreatment system being provided in the exhaust-gas discharge system downstream of the turbines.

The present disclosure also relates to a method for operating a supercharged internal combustion engine of the above-stated type.

An internal combustion engine of the type mentioned in the introduction is used for example as a motor vehicle drive unit. Within the context of the present disclosure, the expression "internal combustion engine" encompasses Otto-cycle engines, diesel engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

Supercharging of the internal combustion engine serves primarily for increasing power. The air needed for the combustion process is compressed, as a result of which a greater air mass can be supplied to each cylinder per working cycle. In this way, the fuel mass and therefore the mean pressure can be increased.

Supercharging is a suitable practice for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption; that is to say to improve the efficiency of the internal combustion engine.

For supercharging, use is generally made of an exhaust-gas turbocharger, in which a compressor and a turbine are arranged on the same shaft. The hot exhaust-gas flow is supplied to the turbine and expands in said turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooling arrangement may additionally be provided, by means of which the compressed charge air is cooled before it enters the cylinders.

The advantage of an exhaust-gas turbocharger for example in comparison with a mechanical charger is that no mechanical connection for transmitting power exists or is needed between the charger and internal combustion engine; such a mechanical connection takes up additional structural space in the engine bay and has a considerable influence on the arrangement of the assemblies. While a mechanical charger extracts the energy demanded for driving it entirely from the internal combustion engine, and thereby reduces the output power and consequently adversely affects the efficiency, the exhaust-gas turbocharger utilizes the exhaust-gas energy of the hot exhaust gases.

Problems are encountered in the configuration of the exhaust-gas turbocharging, wherein it is basically sought to obtain a noticeable performance increase in all engine speed ranges. In the case of internal combustion engines supercharged by way of an exhaust-gas turbocharger, a noticeable torque drop is observed when a certain engine speed is undershot. Said effect is undesirable and is one of the most severe disadvantages of exhaust-gas turbocharging.

Said torque drop is understandable if one takes into consideration that the charge pressure ratio is dependent on the turbine pressure ratio. For example, if the engine speed is reduced, this leads to a smaller exhaust-gas flow and therefore to a lower turbine pressure ratio. This has the effect that, toward low engine speeds, the charge pressure ratio likewise decreases, which equates to a torque drop.

In other examples, it is sought, using a variety of measures, to improve the torque characteristic of an exhaust gas-turbocharged internal combustion engine.

One such measure, for example, is a small design of the turbine cross section and simultaneous provision of an exhaust-gas blow-off facility. Such a turbine is also referred to as a wastegate turbine. If the exhaust-gas mass flow exceeds a critical value, a part of the exhaust-gas flow is, within the course of a so-called exhaust-gas blow-off, conducted via a bypass line past the turbine. Said approach however has the disadvantage that the supercharging behavior is insufficient at relatively high engine speeds.

The torque characteristic of a supercharged internal combustion engine may furthermore be improved by means of multiple turbochargers arranged in parallel, that is to say by means of multiple turbines of relatively small turbine cross section arranged in parallel, turbines being activated successively with increasing exhaust-gas flow rate, similarly to sequential supercharging.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows and the torque characteristic in the lower engine speed range is considerably improved. This is achieved by designing the high-pressure turbine for small exhaust-gas flows and by providing a bypass line by means of which, with increasing exhaust-gas flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine. In the bypass line there is arranged a shut-off element for controlling the exhaust-gas flow conducted past the high-pressure turbine. An internal combustion engine which can be supercharged in two-stage fashion of the above type is described for example in the European patent application EP 1 640 596 A1. The German laid-open specification DE 10 2013 215 574 A1 likewise relates to an internal combustion engine of said type.

The internal combustion engine of the present disclosure also has at least two turbochargers arranged in series.

Two series-connected exhaust-gas turbochargers also offer yet further advantages over those discussed immediately above. The power of the internal combustion engine can be yet further increased by means of two-stage supercharging. Furthermore, the response behavior of an internal combustion engine supercharged in this way is considerably improved, in particular in the part-load range, in relation to a similar internal combustion engine with single-stage supercharging. The reason for this lies in the fact that the relatively small high-pressure stage is less inert than a relatively large exhaust-gas turbocharger used in the context of single-stage supercharging. The rotor or impeller of an exhaust-gas turbocharger of smaller dimensions can be accelerated and decelerated more quickly.

This also has advantages with regard to particle emissions. During an acceleration of the internal combustion engine, the air mass to be supplied to the cylinders follows the increased fuel quantity only with a delay owing to the inertia of the impellers. By contrast, in the case of a relatively small high-pressure turbocharger, the charge air supplied to the engine is adapted virtually without delay, whereby operating states with increased particle emissions are avoided.

The use of multiple exhaust-gas turbochargers however also has disadvantages. With regard to the configuration of the exhaust-gas turbocharging, it is sought to arrange the turbine or turbines as close as possible to the outlet of the internal combustion engine, that is to say close to the outlet openings of the cylinders, in order thereby to be able to make optimum use of the exhaust-gas enthalpy of the hot exhaust gases, which is determined significantly by the exhaust-gas pressure and the exhaust-gas temperature, and to ensure a fast response behavior of the turbocharger. A close-coupled arrangement not only shortens the path of the hot exhaust gases to the turbine but also reduces the volume of the exhaust-gas discharge system upstream of the turbine. The thermal inertia of the exhaust-gas discharge system likewise decreases, specifically owing to a reduction in the mass and length of the part of the exhaust-gas discharge system leading to the turbine. For the reasons stated above, the turbines are generally arranged on the cylinder head at the outlet side. According to other attempts, the exhaust manifold is commonly integrated in the cylinder head. The integration of the exhaust manifold additionally permits dense packaging of the drive unit. Furthermore, the exhaust manifold can benefit from a liquid-type cooling arrangement that may be provided in the cylinder head, such that the manifold does not need to be manufactured from materials that can be subject to high thermal load, which are expensive. In the case of a two-stage supercharging arrangement, however, the close-coupled arrangement of the turbine of the low-pressure stage poses problems.

Exhaust-gas turbocharging has proven to be problematic also in combination with exhaust-gas aftertreatment. An internal combustion engine which can be supercharged in two-stage fashion and which has an exhaust-gas aftertreatment arrangement is described for example in the European patent application EP 1 396 619 A1. EP 1 396 619 A1 relates to the simultaneous use of exhaust-gas turbocharging and exhaust-gas aftertreatment, wherein it is sought for the exhaust-gas aftertreatment system to be arranged as close as possible to the outlet of the internal combustion engine. Numerous concepts are presented.

In one embodiment according to EP 1 396 619 A1, the exhaust-gas flow is diverted, by means of suitable switching devices and bypass lines, so as to be conducted past both turbines. This offers advantages with regard to a catalytic converter arranged in the exhaust-gas discharge system downstream of the turbines, in particular after a cold start or in the warm-up phase of the internal combustion engine, because the hot exhaust gas is supplied directly to the catalytic converter and is not firstly conducted, with a release of heat, through the turbines which are to be regarded as a temperature sink. In this way, the catalytic converter reaches its light-off temperature more quickly after a cold start or in the warm-up phase. A further embodiment provides the arrangement of a second catalytic converter in the bypass line that bypasses the two turbines.

A disadvantage of the concept described in EP 1 396 619 A1 is that, in the warm-up phase of the internal combustion engine, all of the exhaust gas is supplied to the catalytic converters for heating purposes, and no exhaust gas is conducted through the turbines. Thus, during the warm-up phase, no supercharging of the internal combustion engine can occur or be performed, because no charge pressure can be generated using the exhaust-gas energy. A conflict arises between the exhaust-gas turbocharging and the exhaust-gas aftertreatment.

DE 10 2013 215 574 A1 describes a concept in which the low-pressure turbine is equipped with a bypass line. After a cold start, or in the warm-up phase of the internal combustion engine, the hot exhaust gas is supplied, past the low-pressure turbine via a bypass line, directly to an exhaust-gas aftertreatment system provided downstream in the exhaust-gas discharge system. In this way, the low-pressure turbine, which is to be regarded as a temperature sink, is eliminated. In this way, the exhaust-gas aftertreatment system reaches the required temperature more quickly after a cold start or in the warm-up phase. In the meantime, the high-pressure turbine serves for providing the required charge pressure.

To adhere to future limit values for pollutant emissions, further measures are necessary. Aside from the unburned hydrocarbons, the nitrogen oxide emissions are of particular relevance.

Against this background, it is an object of the present disclosure to provide a supercharged, direct-injection internal combustion engine according to the preamble of claim 1, where the problems described above are solved and where it is possible, in particular after a cold start, to simultaneously generate high charge pressures and realize fast heating of the exhaust-gas aftertreatment arrangement, such that the pollutant emissions can be reduced in a satisfactory manner.

It is a further sub-object of the present disclosure to specify a method for operating a supercharged, direct-injection internal combustion engine of the above-stated type.

The issues described above are at least partially solved by a supercharged, direct-injection internal combustion engine having an intake system for the supply of charge air and having an exhaust-gas discharge system for the discharge of exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, the second turbine, which comprises a second turbine housing, of the second exhaust-gas turbocharger being arranged upstream of the first turbine, which comprises a first turbine housing, of the first exhaust-gas turbocharger, and the second compressor of the second exhaust-gas turbocharger being arranged downstream of the first compressor of the first exhaust-gas turbocharger, a first bypass line being provided which branches off from the exhaust-gas discharge system between the first turbine and the second turbine so as to form a first junction point, a valve being arranged in the exhaust-gas discharge system at the first junction point, a second bypass line being provided which branches off from the exhaust-gas discharge system upstream of the second turbine and which opens into the exhaust-gas discharge system again between the first turbine and the second turbine and in which there is arranged a shut-off element, at least one exhaust-gas aftertreatment system being provided in the exhaust-gas discharge system downstream of the turbines, and a nitrogen oxide storage catalytic converter arranged in the first bypass line.

The internal combustion engine according to the present disclosure is equipped with two series-connectable turbines arranged in series in the exhaust-gas discharge system and two series-connectable compressors arranged in series in the intake system.

Here, embodiments are provided in which the first compressor is designed to be larger than the second compressor, because the first compressor forms the low-pressure stage within the context of a two-stage compression, whereas the second compressor compresses the already pre-compressed air and thus constitutes the high-pressure stage.

For this reason, embodiments are provided in which the first turbine is configured to be larger than the second turbine. This is because, within the context of two-stage supercharging, the second turbine serves as a high-pressure turbine, whereas the first turbine serves for expanding an exhaust-gas flow which is already at a relatively low pressure and has a relatively low density owing to the fact that it has already passed through the high-pressure stage.

According to the present disclosure, both the turbine of the high-pressure stage and the turbine of the low-pressure stage have a bypass line through which exhaust gas can be conducted past the respective turbine.

During the warm-up phase, the exhaust-gas flow is conducted through the second turbine, that is to say through the turbine of the high-pressure stage, and, downstream of the second turbine, is conducted, via the first bypass line which branches off from the exhaust-gas discharge system upstream of the first turbine so as to form a first junction point, past the first turbine and, downstream of the first turbine, preferably back into the exhaust-gas discharge system.

If the exhaust-gas flow is conducted through the relatively small second turbine in the warm-up phase, an adequately high charge pressure can be generated. At the same time, by virtue of the first turbine being bypassed, the larger turbine, which is to be regarded as a temperature sink, is eliminated, and the hot exhaust gas is supplied to the at least one exhaust-gas aftertreatment system, which is arranged downstream of the turbines, for which reason said system reaches its light-off temperature more quickly after a cold start or in the warm-up phase.

In the internal combustion engine according to the disclosure, a nitrogen oxide storage catalytic converter for reduction of the nitrogen oxides is additionally provided in the first bypass line. A storage catalytic converter of said type has proven to be desired in particular in the case of direct-injection internal combustion engines which are operated with an excess of air, because in the case of direct-injection internal combustion engines, the nitrogen oxides contained in the exhaust gas cannot be reduced owing to the operating principle, that is to say on account of the lack of reducing agent.

In a storage catalytic converter, the nitrogen oxides are initially absorbed, that is to say collected and stored, in the catalytic converter before being reduced during a regeneration phase for example by means of sub stoichiometric operation ($\lambda<1$) of the internal combustion engine with a lack of oxygen, wherein the unburned hydrocarbons in the exhaust gas and the carbon monoxide serve as reducing agent. Further engine-internal measures for the enrichment of the exhaust gas with reducing agent, in particular with unburned hydrocarbons, are exhaust-gas recirculation and, in the case of diesel engines, throttling in the intake tract. An enrichment of the exhaust gas with unburned hydrocarbons may also be realized by means of a post-injection of fuel into at least one cylinder of the internal combustion engine. A disadvantage here may be oil thinning. It is possible to dispense with engine-internal measures if the reducing agent is introduced directly into the exhaust-gas discharge system, for example by means of an injection of additional fuel upstream of the storage catalytic converter.

During the regeneration phase, the nitrogen oxides are released and converted substantially into nitrogen dioxide, carbon dioxide and water. The temperature of the storage catalytic converter should preferably lie in a temperature window between 200° C. and 450° C., such that firstly a fast reduction is ensured and secondly no desorption without conversion of the re-released nitrogen oxides takes place, such as may be triggered by excessively high temperatures. In this respect, the arrangement according to the disclosure of the storage catalytic converter downstream of the second turbine is particularly advantageous. In this way, fast heating of the storage catalytic converter after a cold start is ensured, without the risk of overheating also arising. Excessively high temperatures can damage the storage catalytic converter, can contribute to thermal aging of the catalytic converter, and can considerably reduce the conversion.

Since the storage catalytic converter according to the present disclosure serves for reduction of nitrogen oxides after a cold start or in the warm-up phase, the catalytic converter is advantageously configured correspondingly, that is to say is configured in accordance with said task. Consequently, the storage catalytic converter is configured, with regard to its volume and its coating, for relatively low exhaust-gas flow rates and low temperatures.

By means of the internal combustion engine according to the present disclosure, the first object on which the disclosure is based is achieved, that is to say a supercharged, direct-injection internal combustion engine is provided comprising a method comprising after a cold start, high charge pressures can be generated and at the same time fast heating of the exhaust-gas aftertreatment systems can be realized in order to be able to reduce the pollutant emissions in a satisfactory manner.

One particular aspect in the use of a storage catalytic converter arises from the sulfur contained in the exhaust gas, which sulfur is likewise absorbed and may be regularly removed by means of a so-called desulfurization. For this purpose, the storage catalytic converter may be heated to high temperatures, conventionally between 600° C. and 700° C., and supplied with a reducing agent. The arrangement according to the disclosure of the storage catalytic converter downstream of the second turbine permits such intense heating of the catalytic converter by means of engine-internal measures without the use of other additional measures.

The limit values for nitrogen oxide emissions as predefined by the legislators may in future necessitate on-board diagnosis for monitoring or detecting the restriction of functionality, that is to say the decrease in conversion, which is to be expected with progressive operating duration. Consequently, embodiments of the internal combustion engine are provided in which an on-board diagnosis is provided for the purposes of monitoring the functionality of the storage catalytic converter and avoiding undesirably high pollutant emissions as a result of restricted functionality or deficient conversion.

The at least one exhaust-gas aftertreatment system downstream of the turbines may be an oxidation catalytic converter, a three-way catalytic converter, a storage catalytic converter, a selective catalytic converter and/or a particle filter. It is also possible for a combination of two or more of the abovementioned exhaust-gas aftertreatment systems to be used.

Embodiments of the supercharged, direct-injection internal combustion engine are provided in which the at least one exhaust-gas aftertreatment system downstream of the turbines is a combined exhaust-gas aftertreatment system which comprises a selective catalytic converter and a particle filter.

In selective catalytic converters, reducing agent is introduced in targeted fashion into the exhaust gas for the purposes of selectively reducing the nitrogen oxides. As reducing agent, in addition to ammonia and urea, use may also be made of unburned hydrocarbons.

To reduce the emissions of soot particles, use may be made of regenerative particle filters which filter the soot particles out of the exhaust gas and store them, with the soot particles being burned off intermittently during the course of a regeneration of the filter. For the regeneration of the particle filter, high temperatures, approximately 550° C. without catalytic assistance, are demanded, which are reached only at high loads and high engine speeds during operation. To ensure a regeneration of the filter under all operating conditions, additional measures may be necessary.

According to the disclosure, at the first junction point, at which the first bypass line branches off from the exhaust-gas discharge system, there is arranged a valve which, in the warm-up phase, in a first working position, blocks the exhaust-gas discharge system toward the first turbine and opens up the first bypass line, such that the exhaust-gas flow is conducted past the relatively large first turbine. This is a crucial advantage in relation to embodiments in which the valve is arranged in the bypass line itself and in which, when the valve is open, exhaust gas can continue to flow into the turbine of the low-pressure stage. The turbine of the low-pressure stage then indeed also poses a certain resistance to flow. Nevertheless, a part of the exhaust-gas flow passes through the relatively large first turbine. However, in the operating modes under consideration here, said partial flow constitutes, in percentage terms, an significant part of the overall exhaust-gas flow (e.g., less than 5%) which is then not directly available to the storage catalytic converter or the at least one exhaust-gas aftertreatment system for heating purposes after a cold start.

Embodiments are provided in which the valve arranged at the first junction point, in a second working position, opens up the exhaust-gas discharge system toward the first turbine and blocks the first bypass line.

The internal combustion engine is supercharged either in single-stage fashion using the second exhaust-gas turbocharger in accordance with a first operating mode, or supercharged in two-stage fashion using the first exhaust-gas turbocharger and the second exhaust-gas turbocharger in accordance with a second operating mode.

In the first operating mode, the valve arranged at the first junction point is then situated in the first working position, whereas, in the second operating mode, the valve is situated in the second working position.

Embodiments of the supercharged, direct-injection internal combustion engine are provided in which the valve at the first junction point is a 3-2-way valve, that is to say a valve with three ports and two switching positions.

Embodiments of the supercharged, direct-injection internal combustion engine are provided in which the valve at the first junction point is a pivotable flap.

In this connection, embodiments of the supercharged, direct-injection internal combustion engine are provided in which the flap, when opening up the first bypass line proceeding from a state in which the first bypass line is shut off, is pivotable counter to the exhaust-gas flow direction. Then, if the flap develops a defect, it is pivoted by the exhaust-gas flow into the position in which the first bypass line is blocked, and the exhaust gas flows through both turbines.

Embodiments of the supercharged, direct-injection internal combustion engine are provided in which the valve can be electrically, hydraulically, pneumatically, mechanically or magnetically controlled by an engine controller.

Embodiments of the supercharged, direct-injection internal combustion engine are provided in which the first bypass line opens into the exhaust-gas discharge system again downstream of the first turbine.

The fact that the first bypass line opens into the exhaust-gas discharge system again has the adaptation that, then, all of the exhaust gas can be supplied to the at least one exhaust-gas aftertreatment system provided in the exhaust-gas discharge system.

Embodiments of the supercharged, direct-injection internal combustion engine are therefore also provided in which the first bypass line opens into the exhaust-gas discharge system again upstream of the at least one exhaust-gas aftertreatment system provided in the exhaust-gas discharge system downstream of the turbines.

Embodiments of the supercharged, direct-injection internal combustion engine are provided in which the nitrogen oxide storage catalytic converter arranged in the first bypass line is designed for the exhaust-gas aftertreatment during a warm-up phase of the internal combustion engine in the presence of low temperatures.

Embodiments of the supercharged, direct-injection internal combustion engine are provided in which the second bypass line opens into the exhaust-gas discharge system again upstream of the first junction point.

If the valve arranged at the first junction point is then situated in its first working position, in which the first bypass line is opened up and the exhaust-gas discharge system toward the first turbine is blocked, the internal combustion engine is supercharged in single-stage fashion using the second exhaust-gas turbocharger in accordance with a first operating mode, wherein all of the exhaust gas passes through the first bypass line and no exhaust gas is conducted to the first turbine, specifically not even if the second bypass line is opened up for exhaust gas by virtue of the shut-off element being opened.

Embodiments of the supercharged, direct-injection internal combustion engine may however also be provided in which the second bypass line opens into the exhaust-gas discharge system again downstream of the first junction point.

By contrast to the embodiment above, it is then possible for exhaust gas to be supplied to the first turbine even when the valve arranged at the first junction point, in its first working position, blocks the exhaust-gas discharge system toward the first turbine, specifically by virtue of the second bypass line being opened up as a result of opening of the shut-off element. In this way, the first turbine can be kept at a predefinable minimum rotational speed, whereby the response behavior of the supercharging arrangement is improved. Furthermore, it is made possible for the first turbine to be accelerated by means of exhaust gas from the second bypass line before the valve arranged at the first junction point is transferred into its second working position. The switch of the internal combustion engine from single-stage supercharging to two-stage supercharging can thereby be considerably improved.

Embodiments of the supercharged, direct-injection internal combustion engine are provided in which a third bypass line is provided which opens into the intake system between the first compressor and the second compressor so as to form a second junction point and in which there is arranged a further shut-off element.

The third bypass line may serve for the blow-off of charge air compressed in the first compressor. In particular, the third bypass line may however serve for the induction of charge air, specifically in the case of bypassing of the first compressor, which merely constitutes a flow resistance in the case of single-stage supercharging by means of the high-pressure stage.

Embodiments of the supercharged, direct-injection internal combustion engine are provided in which a charge-air cooler is arranged in the intake system between the first compressor and the second compressor.

In the present case, a charge-air cooler is arranged in the intake system between the compressors. In the context of two-stage compression, the charge-air cooler lowers the temperature of the charge air compressed in the low-pressure stage and thereby increases the density of the charge air, as a result of which the compression in the high-pressure stage is improved and the outlet temperature of the high-pressure stage can be lowered given an identical overall pressure ratio of the supercharging assembly. This also decreases a likelihood of thermal overloading. By means of a charge-air cooler, it is however also possible for the overall pressure ratio of the compressor group to be increased, and thus for the power to be further increased, that is to say for the power increase to be further enhanced.

The charge-air cooler which is arranged between the compressors also makes it possible to omit, that is to say eliminate, a bypass line which, in other attempts, may imperatively be provided at the high-pressure compressor. A bypass line of said type is not imperatively necessary in the present case. Either the high-pressure compressor compresses smaller quantities of charge air in the context of single-stage compression, or relatively large quantities of charge air in the context of two-stage compression, wherein relatively large quantities of charge air are pre-compressed in the low-pressure stage and intercooled in the charge-air cooler before the charge air pre-treated in this way enters the second compressor stage, that is to say the second compressor. Bypassing of the second compressor is not necessary in either of said two operating modes. Dense packaging of the supercharging arrangement and of the drive unit as a whole is made possible.

An operating mode in which charge air is compressed in the context of single-stage compression in the low-pressure stage and is subsequently conducted past the high-pressure compressor via a bypass line is basically possible but is not preferable. In this respect, a switchover of the internal combustion engine or of the supercharging arrangement into said operating mode is also omitted. An undesired torque drop, such as could basically arise in the case of such a switchover, is omitted along with the switchover process.

The internal combustion engine has an improved torque characteristic, and fundamentally improved operating behavior. In some cases, it is possible for the internal combustion engine, in the presence of relatively high loads, to be supercharged and operated in two-stage fashion in accordance with the second operating mode over the entire engine speed range.

In the present context, embodiments of the supercharged, direct-injection internal combustion engine are advantageous in which the third bypass line opens into the intake system between the charge-air cooler and the second compressor so as to form the second junction point.

Then, in the context of the single-stage compression, the charge air is not cooled before entering the high-pressure compressor, said charge air being cooled only in the context of the two-stage compression. It may also be taken into consideration that single-stage compression is realized in particular when the internal combustion engine is not yet at operating temperature during the warm-up phase, in which it is particularly expedient for the charge air to be supplied to the high-pressure compressor without being cooled in order that the warm-up process of the internal combustion engine is not unduly delayed.

Embodiments of the supercharged, direct-injection internal combustion engine are provided in which the third bypass line branches off from the intake system upstream of the first compressor.

Embodiments of the supercharged, direct-injection internal combustion engine are provided in which the first compressor is designed to be larger than the second compressor.

Embodiments of the supercharged, direct-injection internal combustion engine are provided in which the first turbine is designed to be larger than the second turbine.

Embodiments of the supercharged, direct-injection internal combustion engine are provided in which the second turbine of the second exhaust-gas turbocharger has a variable turbine geometry.

A variable turbine geometry increases the flexibility of the supercharging. It permits a continuous adaptation of the turbine geometry to the respective operating point of the internal combustion engine and to the present exhaust-gas mass flow. By contrast to a turbine with fixed geometry, it is possible to realize more or less satisfactory supercharging over a broad engine speed and load range.

In particular, the combination of a turbine with variable turbine geometry and a second bypass line that bypasses said turbine makes it possible for the high-pressure turbine to also be designed for very small exhaust-gas flows and thus for the lower part-load range. It is consequently possible to achieve high turbine pressure ratios even at low engine speeds and even in the case of very low exhaust-gas flow rates.

In the case of internal combustion engines having at least two cylinders, in which each cylinder has at least one outlet opening for the discharge of the exhaust gases via the exhaust-gas discharge system and each outlet opening is adjoined by an exhaust line, embodiments are advantageous in which the exhaust lines of at least two cylinders merge to form an exhaust manifold. The merging of exhaust lines yields a compact construction of the exhaust-gas discharge system, wherein the overall length of the exhaust lines is shortened, and the volume is reduced. This reduces the thermal inertia of the exhaust-gas discharge system as far as the high-pressure turbine, such that exhaust gas which is richer in energy is available at the inlet into the high-pressure turbine. The overall efficiency of the internal combustion engine likewise increases here.

In this context, embodiments of the supercharged, direct-injection internal combustion engine are provided in which the exhaust manifold is equipped at least in regions with thermal insulation. The thermal insulation counteracts cooling of the exhaust gas as it flows through the manifold, because the insulation, as a barrier, impedes or hinders the extraction of heat via the manifold.

In this context, embodiments of the supercharged, direct-injection internal combustion engine are provided in which the thermal insulation comprises at least one air cushion situated in a cavity. The at least one air cushion serves as a heat barrier, wherein the cavity may be closed or open, for example in the manner of an undercut or recess.

The manifold is preferably not a cast part into which the at least one cavity is formed as an integral constituent part during the course of the casting process. Rather, the manifold is preferably an assembled manifold, composed for example of metal sheets, in the case of which the at least one cavity is formed during the assembly process using shell elements arranged spaced apart from one another. Cast parts may possibly be attached to said manifold, for example a cast flange for the fastening of the manifold to the cylinder head or the like.

In this context, embodiments of the supercharged, direct-injection internal combustion engine are provided in which the turbine housing of the second turbine is at least partially formed integrally with the exhaust manifold. That part of the turbine housing which is formed integrally with the manifold may serve as a mounting or fastening for the second exhaust-gas turbocharger, wherein a preassembled unit comprising the high-pressure compressor, the bearing housing and the turbine rotor can be inserted into that part of the turbine housing which is formed integrally with the manifold. In this respect, the turbine housing of the second turbine may also be a housing which is partially formed integrally with the exhaust manifold and which is partially cast, wherein the parts of the housing are connected to one another during the assembly process.

Embodiments of the supercharged, direct-injection internal combustion engine are provided in which the turbine housing of the first turbine is fastened to the internal combustion engine. This embodiment ensures that the large low-pressure stage does not place a disproportionate load, that is to say burden, on the manifold. This is advantageous in particular with regard to a manifold constructed from metal sheets, which exhibits limited strength and dimensional stability in relation to a cast manifold.

In the case of an internal combustion engine having a cylinder block and at least one cylinder head, embodiments are in this context provided in which the turbine housing of the first turbine is fastened to the cylinder block of the internal combustion engine. This ensures a compact construction of the internal combustion engine. The turbine housing of the first turbine may be a cast part.

Here, embodiments of the supercharged, direct-injection internal combustion engine are provided in which at least one connection between the turbine housing of the first turbine and an exhaust-gas-conducting line is formed using vibration-damping elements. This embodiment makes allowance for the fact that vibrations are introduced from the cylinder block and/or cylinder head into the turbine housing of the first turbine, which vibrations can propagate or be transmitted into the parts connected to the turbine housing. It is sought to prevent or impede this by means of vibration-damping elements.

Embodiments of the supercharged, direct-injection internal combustion engine are provided in which a further charge-air cooler is arranged in the intake system downstream of the compressors. The further charge-air cooler lowers the air temperature and thereby increases the density of the finally compressed air, as a result of which the further cooler contributes to improved charging of the cylinders with air, that is to say to a greater air mass.

Embodiments of the supercharged, direct-injection internal combustion engine are provided in which no bypass line which bypasses the second compressor is provided. Reference is made to the statements made in this regard above.

Embodiments of the supercharged, direct-injection internal combustion engine are provided in which the first turbine has a fixed, invariable turbine geometry. This embodiment has, in particular, cost savings. Firstly, with this type of turbine construction, the complex and expensive adjustment mechanism is dispensed with. Secondly, owing to the operating principle, no control of the turbine is desired.

Embodiments of the supercharged, direct-injection internal combustion engine are provided in which the first compressor has a fixed, invariable compressor geometry. Compressors with a fixed geometry have cost advantages for the same reasons as turbines with a fixed geometry, specifically owing to the simpler construction.

Embodiments of the supercharged, direct-injection internal combustion engine are provided in which an exhaust-gas recirculation arrangement is provided.

To adhere to future limit values for nitrogen oxide emissions, it may be desired to provide exhaust-gas recirculation, that is to say the recirculation of exhaust gases from the exhaust-gas discharge system into the intake system, wherein the nitrogen oxide emissions can be lowered considerably with increasing exhaust-gas recirculation rate.

Embodiments of the supercharged, direct-injection internal combustion engine are provided in which the line for exhaust-gas recirculation opens into the intake system downstream of a charge-air cooling arrangement. In this way, the exhaust-gas flow is not conducted through the charge-air cooler, and consequently, said cooler cannot be fouled by deposits of pollutants, in particular soot particles and oil, contained in the exhaust-gas flow.

Embodiments of the supercharged, direct-injection internal combustion engine are provided in which an additional cooler is provided in the line for exhaust-gas recirculation. Said additional cooler lowers the temperature in the hot exhaust-gas flow and thereby increases the density of the exhaust gases. The temperature of the cylinder fresh charge which results upon the mixing of the charge air with the recirculated exhaust gases is consequently further reduced in this way, as a result of which the additional cooler also contributes to improved charging of the combustion chamber with fresh mixture.

Embodiments of the supercharged, direct-injection internal combustion engine are provided in which a shut-off element is provided in the line for exhaust-gas recirculation. Said shut-off element serves for the control of the exhaust-gas recirculation rate.

The second sub-object on which the disclosure is based is achieved by way of a method wherein the internal combustion engine is supercharged either in single-stage fashion using the second exhaust-gas turbocharger in accordance with a first operating mode, or is supercharged in two-stage fashion using the first exhaust-gas turbocharger and the second exhaust-gas turbocharger in accordance with a second operating mode.

That which has been stated in connection with the internal combustion engine according to the disclosure likewise applies to the method according to the disclosure.

Method variants are provided in which, in the warm-up phase, through actuation of the valve arranged at the first junction point, the first bypass line is opened up and an exhaust-gas flow to the first turbine via the second turbine is prevented, the internal combustion engine being supercharged in single-stage fashion using the second exhaust-gas turbocharger in accordance with the first operating mode.

Method variants are provided in which, after the warm-up phase, the first bypass line is opened up in order to perform a regeneration of the nitrogen oxide storage catalytic converter arranged in the first bypass line. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2B shows a detailed depiction of the double-walled insulation of the integrated exhaust manifold arranged in an engine head.

DETAILED DESCRIPTION

Figure 1:
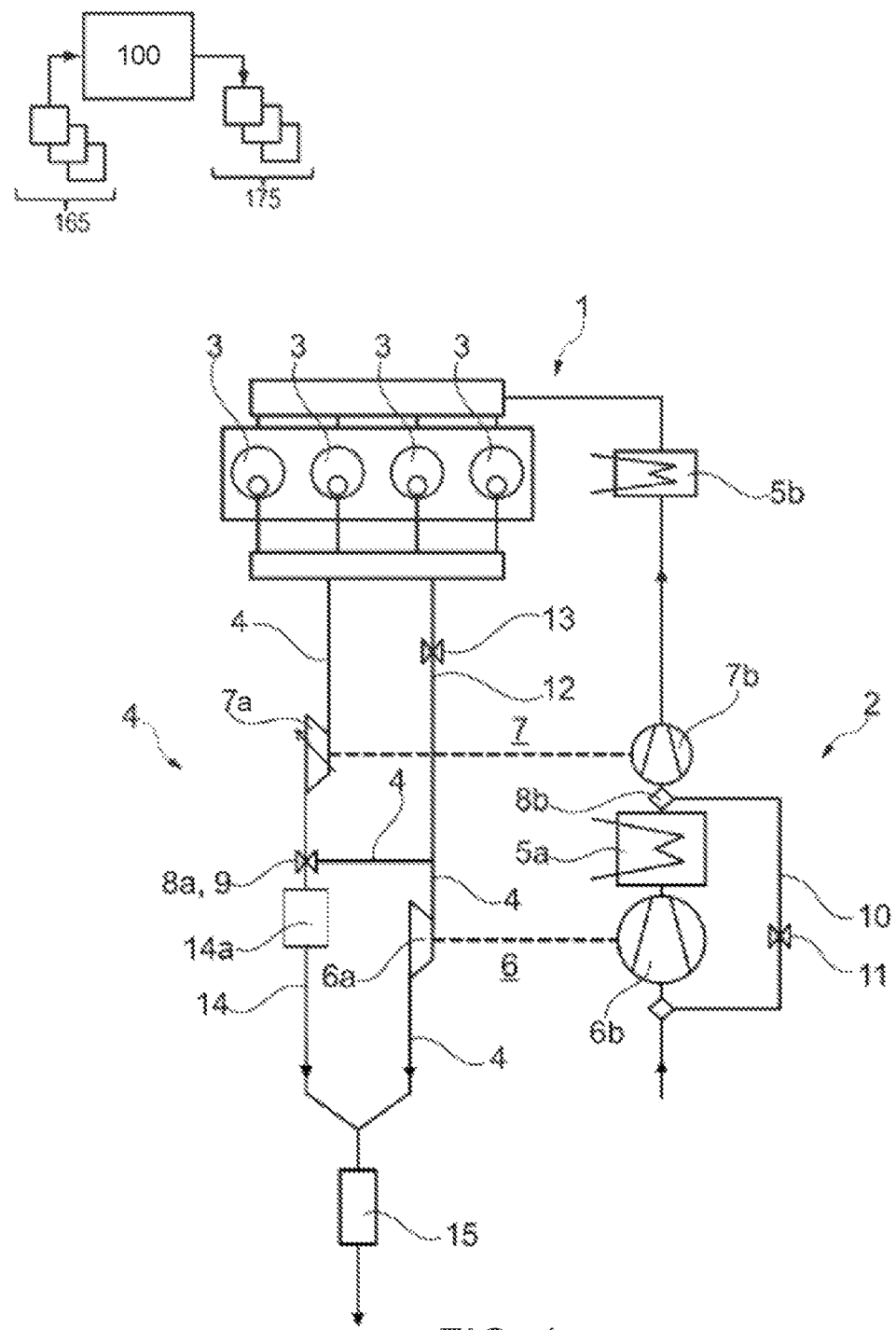
FIG. 1 schematically shows a first embodiment of the supercharged internal combustion engine.

The following description relates to systems and methods for a two-stage turbocharger and integrated exhaust manifold. An engine schematic illustrating the two-stage turbocharger coupled to the engine is shown in FIG. 1. The engine system illustrates a first bypass line is configured to bypass exhaust gases around the LP turbine during some engine operating conditions. Additionally, the engine system further includes a second bypass configured to bypass exhaust gases around the HP turbine during some engine operating conditions. Lastly, a third bypass line may be included with the engine system without departing from the scope of the present disclosure. The third bypass line may be configured to bypass exhaust gas around both the LP and HP turbines during engine conditions where boost is not desired.

Figure 2A:
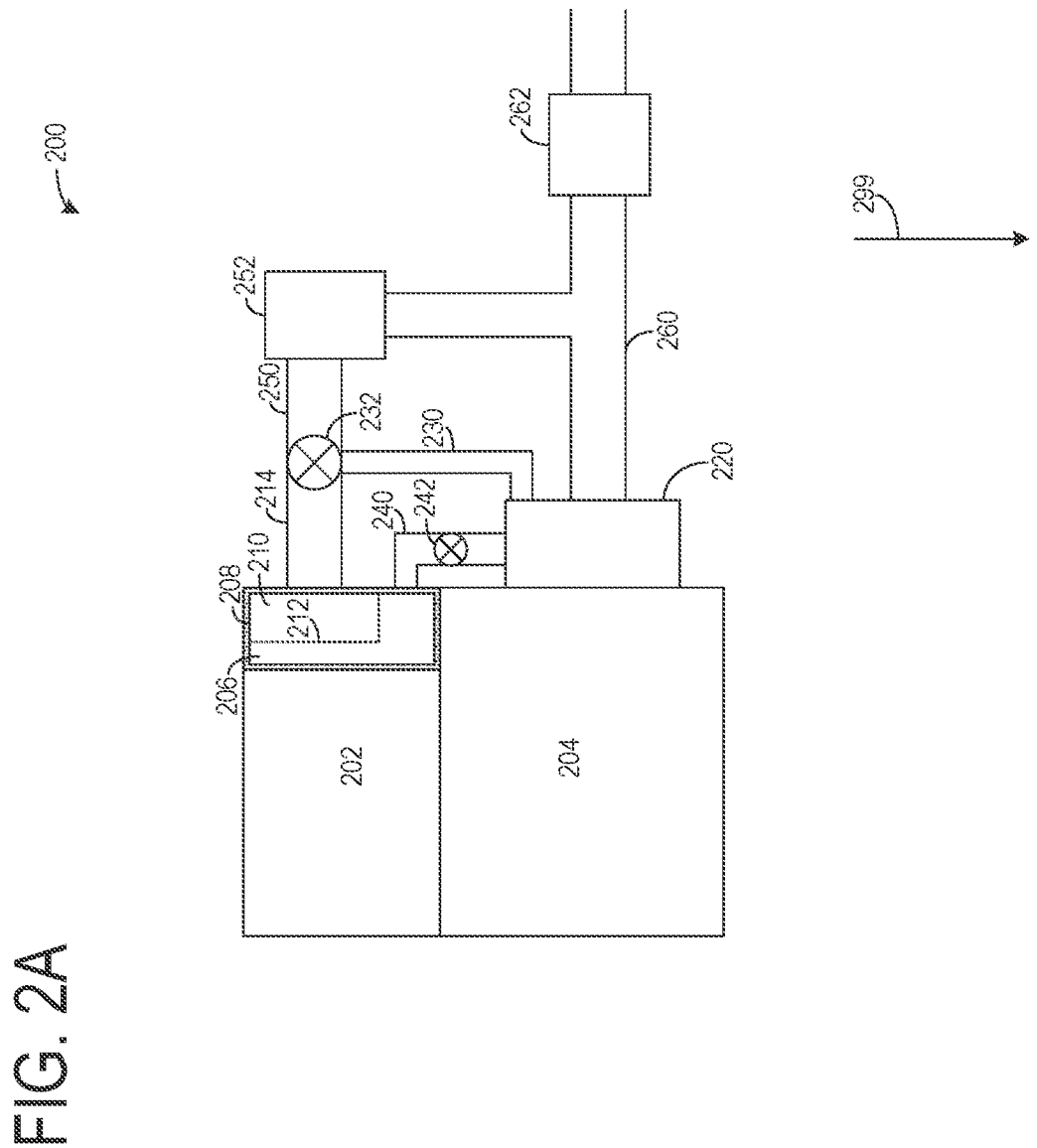
FIG. 2A shows an embodiment of an integrated exhaust manifold having double-walled insulation.

The HP and LP turbines are shown in greater detail relative to a head and a block of the engine in FIGS. 2A and 2B. In one example, the HP turbine is arranged in the head with the exhaust manifold. The exhaust manifold and HP turbine housing may be double-walled to provide insulation, thereby reducing exhaust gas thermal inertia therethrough. The LP turbine is arranged below the HP turbine and is coupled to an outside surface of the engine block. The LP turbine and pipes leading from the exhaust manifold to the LP turbine may not be insulated.

Figure 3:
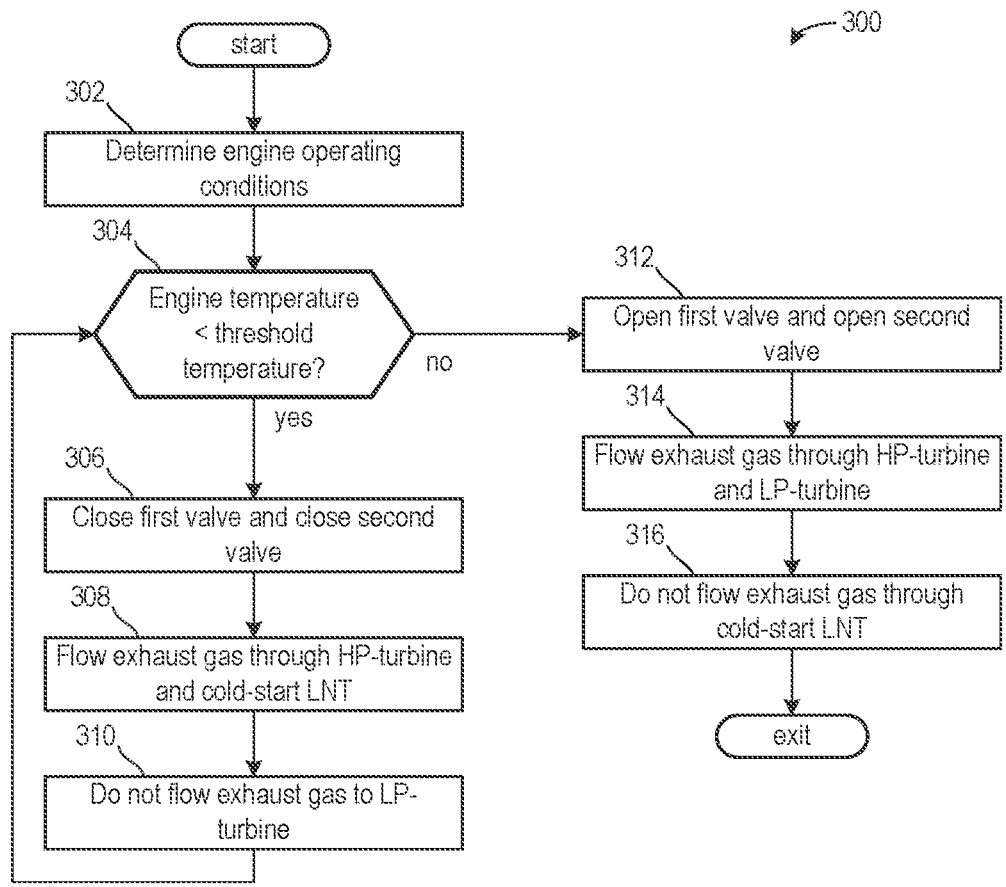
FIG. 3 shows a method for adjusting exhaust gas flow through a high-pressure (HP) turbine and a low-pressure (LP) turbine.

A method for operating the HP turbine and the LP turbine based on one or more engine conditions is shown in FIG. 3. The method includes bypassing exhaust gas around the LP turbine during cold-start condition to prevent heat loss. Thus, hot exhaust gas may flow directly from the HP turbine to a lean $NO_x$ trap arranged the first bypass passage. The method further includes bypassing at least a portion of exhaust gas around the HP turbine during some engine conditions outside of the cold-start. This may be due to the limited boosting power of the HP turbine relative to the LP turbine. Specifically, the HP turbine may be smaller than the LP turbine, and therefore may approach a surge limit relatively quickly compared to the LP turbine.

Figure 4:
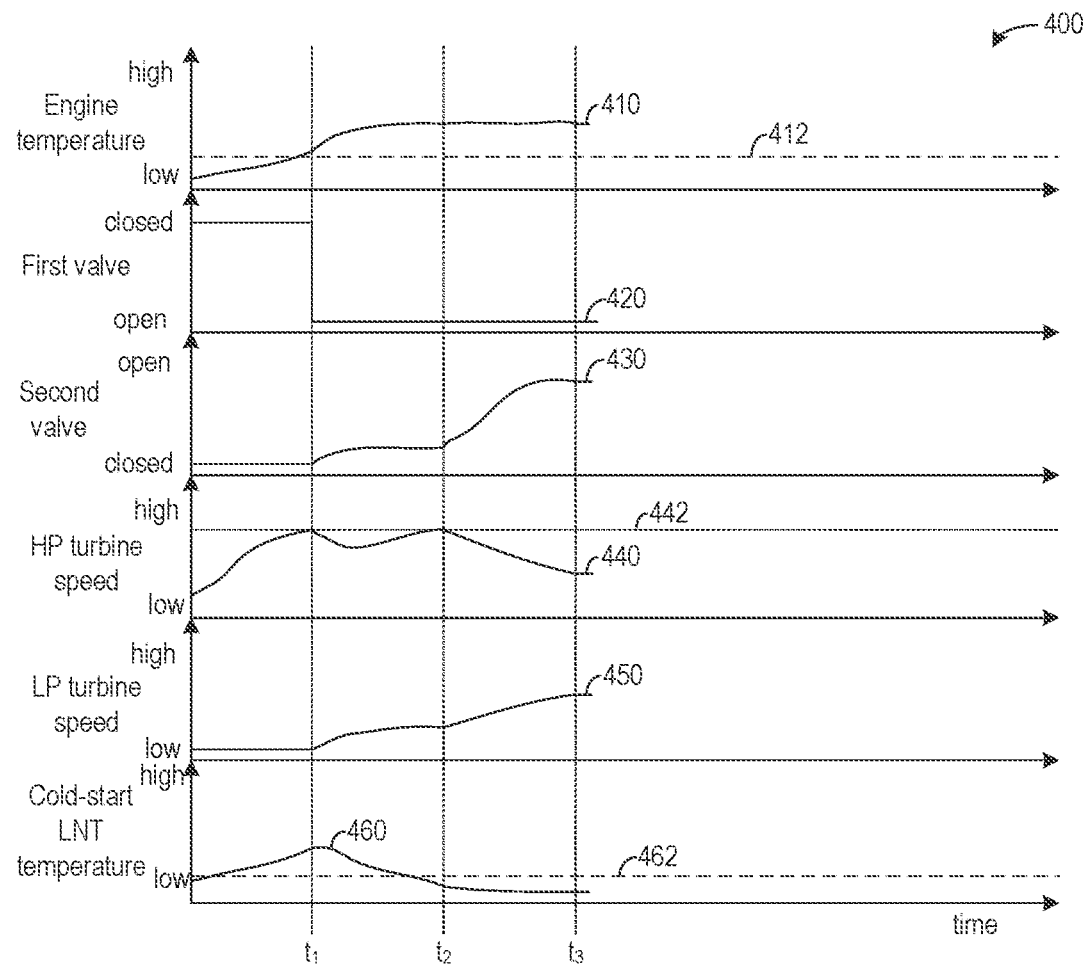
FIG. 4 shows an engine operating sequence depicting various engine operating parameters.

An engine operating sequence illustrating various engine conditions ranging from a cold-start to warmed-up engine operating parameters is shown in FIG. 4. The engine operating sequence further illustrates adjusting a position of a valve in the second bypass based on HP turbine speeds relative to a surge limit.

FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure will be described in more detail below on the basis of an exemplary embodiment according to FIG. 1.

FIG. 1 shows a first embodiment of the supercharged internal combustion engine 1, based on the example of a four-cylinder in-line engine. The four cylinders 3 of the internal combustion engine 1 are arranged in a line along the longitudinal axis of the cylinder head. The exhaust lines of the cylinders 3 merge to form a common exhaust-gas discharge system 4, whereby all of the exhaust lines are connected to one another, and the same exhaust-gas pressure prevails in all exhaust lines. Furthermore, the internal combustion engine 1 has an intake system 2 for the supply of charge air to the cylinders 3.

The internal combustion engine 1 is equipped with two series-connectable turbines 6a, 7a arranged in the exhaust-gas discharge system 4 and two series-connectable compressors 6b, 7b arranged in the intake system 2, wherein in each case one turbine 6a, 7a and one compressor 6b, 7b are combined to form an exhaust-gas turbocharger 6, 7, respectively. The charge air supplied to the internal combustion engine 1 can thus be compressed in two stages, wherein a first exhaust-gas turbocharger 6 serves as a low-pressure stage 6 and a second exhaust-gas turbocharger 7 serves as a high-pressure stage 7. The second turbine 7a of the second exhaust-gas turbocharger 7 is arranged upstream of the first turbine 6a of the first exhaust-gas turbocharger 6, and the second compressor 7b of the second exhaust-gas turbocharger 7 is arranged downstream of the first compressor 6b of the first exhaust-gas turbocharger 6.

The first compressor 6b is designed to be larger than the second compressor 7b, because the first compressor 6b forms the low-pressure stage 6 within the context of a two-stage compression, whereas the second compressor 7b compresses the already pre-compressed air and thus constitutes the high-pressure stage 7.

For the same reason, the first turbine 6a is designed to be larger than the second turbine 7a. This is because the second turbine 7a serves as a high-pressure turbine 7a, whereas the first turbine 6a serves for expanding an exhaust-gas flow which is already at a relatively low pressure and has a relatively low density owing to the fact that it has already passed through the high-pressure stage 7.

A charge-air cooler 5a is arranged in the intake system 2 between the first compressor 6b and the second compressor 7b. A further charge-air cooler 5b is provided downstream of the compressors 6b, 7b. The air temperature is lowered and thus the density of the charge air is increased, whereby improved charging of the cylinders 3 with air is achieved.

An exhaust-gas aftertreatment system 15 is provided in the overall exhaust line 4 downstream of the turbines 6a, 7a.

In the embodiment illustrated in FIG. 1, the first turbine 6a has a fixed, invariable turbine geometry and a first bypass line 14 which branches off from the exhaust-gas discharge system 4 between the first turbine 6a and the second turbine 7a so as to form a first junction point 8a. The first bypass line 14 opens into the exhaust-gas discharge system 4 again downstream of the first turbine 6a and upstream of the exhaust-gas aftertreatment system 15 provided in the exhaust-gas discharge system 4. A valve 9, in the present case a 3-2-way valve 9, is arranged at the first junction point 8a.

The second turbine 7a of the second exhaust-gas turbocharger 7 has a variable turbine geometry and a second bypass line 12, which branches off from the exhaust-gas discharge system 4 upstream of the second turbine 7a and which opens into the exhaust-gas discharge system 4 again downstream of the first junction point 8a, between the first turbine 6a and the second turbine 7a. A shut-off element 13 is arranged in the second bypass line 12.

The first compressor 6b is equipped with a third bypass line 10 which branches off from the intake system 2 upstream of the first compressor 6b and which opens into the intake system 2 between the first compressor 6b and the second compressor 7b so as to form a second junction point 8b. The third bypass line 10 has a further shut-off element 11 and opens into the intake system 2 between the charge-air cooler 5a and the second compressor 7b.

In the first bypass line 14 there is arranged a nitrogen oxide storage catalytic converter 14a for reducing the nitrogen oxides, which nitrogen oxide storage catalytic converter reduces the nitrogen oxides in particular during the warm-up phase, for which purpose the first bypass line 14 is opened up.

Controller 100 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 100 may be configured to receive information from a plurality of sensors 165 and to send control signals to a plurality of actuators 175 (various examples of which are described herein). Other actuators, such as a variety of additional valves and throttles, may be coupled to various locations in engine system. Controller 100 may receive input data from the various sensors, process the input data, and trigger the actuators in response to the processed input data based on instruction or code programmed therein corresponding to one or more routines. Example control routines are described herein with regard to FIG. 3.

The controller 100 receives signals from the various sensors of FIG. 1 and employs the various actuators of FIG. 1 to adjust engine operation based on the received signals and instructions stored on a memory of the controller. For example, the controller 100 may receive a signal from a temperature sensor indicating that an engine temperature is less than a threshold and/or ambient temperature, thereby indicating a cold-start. In response to the cold-start, the controller 100 may signal to an actuator of the valve in the first bypass line 14 to open, thereby directing exhaust gas to the nitrogen oxide storage catalytic converter directly from the HP turbine 7a and not flowing exhaust gas to the LP turbine 6a.

Turning now to FIG. 2A, it shows an embodiment 200 of a vehicle with its wheels on the ground. In one example, the embodiment 200 may be used similar to the embodiment illustrated in FIG. 1. The embodiment 200 illustrates a head 202 and a block 204. The head 202 is vertically above the block 204 relative to arrow 299, which indicates a direction of gravity (herein, gravity 299).

The block 204 comprises the cylinders and associating structures, such as, coolant passages, intake and exhaust passages and ports, and the crankcase. The head 202 may be coupled to the block 204 via one or more of bolts, welds, and the like. Within the head 202, valves, fuel injectors, and spark plugs may be mounted. Spark plugs may be omitted from sparkless engines (diesel). Intake gas is fed to the intake passages in the block via openings and/or passages in the head. Likewise, exhaust gas is expelled from the exhaust passages in the block 204 to an exhaust manifold (e.g., exhaust manifold 206).

In the embodiment 200, the exhaust manifold 206 is an integrated exhaust manifold and is located completely inside the head 202. In one example, the exhaust manifold 206 is double-walled, comprising insulation 208 between the two walls of the exhaust manifold. The outer wall and inner wall may be composed of different materials. For example, the outer wall may comprise a material suitable for higher mechanical loads and stresses created during vehicle locomotion. Alternatively, the inner wall may be thinner than the outer wall. The walls may be hermetically sealed with one another such that the insulation 208 located therebetween may not escape. The insulation 208 may be air, liquid, and the like. Alternatively, if the insulation 208 is air, then the outer wall may comprise a small opening such that air may escape during certain conditions.

The insulation 208 extends around HP turbine housing 210 (herein, HP turbine 210). As shown, the HP turbine 210 is arranged completely inside the head 202 in close proximity to the exhaust manifold 206. This along with the insulation 208 may mitigate thermal inertia such that heat loss through the exhaust manifold 206 and HP turbine 210 is reduced. In one example, the HP turbine 210 is used similarly to second turbine 7a of FIG. 1. Dashed line 212 distinguishes an area of the HP turbine 210 from the exhaust manifold 206.

Turning now to FIG. 2B, it shows a detailed view 280 of the head 202. As shown, the exhaust manifold 206 corresponds to an inline, four cylinder engine, wherein each cylinder comprises a single exhaust gas port. It will be appreciated that the exhaust manifold 206 may be modified to accommodate different engines (e.g., V-6) and/or different numbers of exhaust gas ports (e.g., two per cylinder). As shown, the exhaust manifold 206 and the HP turbine 210 are arranged completely within the head 202. Insulation 208 surrounds the HP turbine 210 and the exhaust manifold 206. The coupling between the exhaust manifold 206 and LP turbine 220 is occluded in the current view.

Returning to FIG. 2A, as described above, the HP turbine 210 is part of a two-stage turbocharger which further comprises a LP turbine 220. The LP turbine 220 is bolted to the block 204, in one example. However, other coupling elements may be used to fix the LP turbine 220 to the block, for example, welds, fusions, adhesives, and the like. As shown, the LP turbine 220 is vertically lower than the HP turbine 210. In one example, the LP turbine 220 is not insulated. As described above, the LP turbine 220 may be larger than the HP turbine 210.

While the housing of the HP turbine 210 and the exhaust manifold 206 are comprised of an insulated structure, the LP turbine 220 may comprise a cast-iron structure, similar to the block 204 and/or the head 202.

The HP turbine 210 is directly coupled to the exhaust manifold 206. Exhaust gas flowing from the exhaust manifold 206 to the HP turbine 210 may flow through only insulated passages and/or housings. The LP turbine 220 is not directly coupled to the exhaust manifold 206, in one example. The LP turbine 220 may receive exhaust gas from the exhaust manifold 206 via a HP turbine bypass passage 240. In one example, the HP turbine bypass passage 240 may be used similarly to second bypass line 12 of FIG. 1. The HP turbine bypass passage 240 further comprises a valve 242, which may adjust an amount of exhaust gas flowing through the HP turbine bypass passage 240. For example, the valve 242 may be actuated to one or more of a fully open position, a fully closed position, and positions therebetween. The fully open position may admit a maximum amount of exhaust gas through the HP turbine bypass passage 240. The fully closed position may prevent exhaust gas from flowing to the HP turbine bypass passage 240. In one example, exhaust gas is forced to flow from the exhaust manifold 206 to the HP turbine 210 when the valve 242 is in the fully closed position. Positions in-between fully closed and fully open may be described as more open and more closed, where more open positions admit more exhaust gas into the HP turbine bypass passage 240 than more closed positions. In this way, exhaust gas flowing through the HP turbine bypass passage 240 does not flow through the HP turbine 210.

The HP turbine bypass passage 240 may be fabricated of steel tubing. The passage 240 may extend from a portion of the exhaust manifold 206 below the HP turbine 210 and outside of the head 202. The passage 240 is not insulated, in one example. Thus, the passage 240 may allow exhaust gas flowing therethrough to communicate with ambient air located exterior to the passage 240.

The LP turbine 220 may also receive exhaust gas from downstream of the HP turbine 210 via connecting passage 230. The connecting passage 230 may receive exhaust gas from the HP turbine 210 when valve 232 is an at least partially open position. In one example, the valve 232 is a binary valve with only fully closed and fully open positions. The valve 232 is arranged at an intersection between a HP turbine outlet 214, connecting passage 230, and LP turbine bypass 250. Alternatively, the valve 232 is similar to valve 242 and may comprise a plurality of positions between fully open and fully closed. Herein, valve 232 may be referred to as first valve 232 and valve 242 may be referred to as second valve 242.

If the first valve 232 is closed, then exhaust gas may flow from the HP turbine outlet 214 to the LP turbine bypass 250 without flowing to the connecting passage 230. The LP turbine bypass 250 directs the exhaust gas to lean $NO_x$ trap 252. The lean $NO_x$ trap 252 may capture $NO_x$ in the exhaust gas flow during certain exhaust gas temperatures (e.g., temperatures below a first threshold) and release the $NO_x$ when exhaust gas temperatures are greater than a second threshold. In one example, the first threshold is less than the second threshold. The first threshold may correspond to an exhaust gas temperature corresponding to engine operations below a desired operating temperature (e.g., engine warmed-up and outside of a cold-start). The second threshold may correspond to an exhaust gas temperature once the engine has warmed-up. Thus, the lean $NO_x$ trap may store $NO_x$ during an engine cold-start and release the $NO_x$ when exhaust gas is directed to the lean $NO_x$ trap once the engine has warmed-up.

In one example, the lean $NO_x$ trap is a cold-start lean $NO_x$ trap, where the $NO_x$ trap is configured to capture $NO_x$ in exhaust gas during a cold-start. This may include increasing a cerium oxide (CeO) loading of the cold-start lean $NO_x$ trap such that the catalyst may store $NO_x$ at low temperatures (e.g., temperatures coinciding with the cold-start). At desired engine operating temperatures (e.g., 200° C.), the cold-start lean $NO_x$ trap may no longer efficiently capture $NO_x$.

In this way, the first valve 232 may be closed during a cold-start. Additionally, to increase heating of the lean $NO_x$ trap, the second valve 242 is adjusted to the fully closed position to force all exhaust gas from the exhaust manifold 206 to the HP turbine 210, where the exhaust gas then flows through the HP turbine outlet 214, through the LP turbine bypass 250, and into the lean $NO_x$ trap 252. Exhaust gas from the lean $NO_x$ trap 252 may flow through a remainder of the LP turbine bypass 250 and enter a portion of exhaust passage 260 at a location downstream of the LP turbine 220. Exhaust gas in the exhaust passage 260 may flow through an aftertreatment device 262 prior to flowing through a remainder of the exhaust passage 260 or to an ambient atmosphere.

Once the cold-start is complete and the engine has warmed-up, the exhaust gas flow through the passages described above may be adjusted. For example, the first valve 232 is opened such that exhaust gas from the HP turbine outlet 214 flows through the connecting passage 230 and into the LP turbine 220. Additionally, as the HP turbine 210 approaches a surge limit and operation of the turbine may become unstable. To decrease the likelihood of surge occurring in the HP turbine 210, the second valve 242 may be incrementally opened such that the HP turbine bypass passage 240 receives exhaust gas from the exhaust manifold 206. Incrementally opening the second valve 242 may include opening the second valve based on driver demand, where the second valve 242 is opened to a position corresponding to a difference between an amount of driver demand supplied by the HP turbine 210 and the total driver demand. In this way, the LP turbine 220 may meet a remainder of the driver demand that the HP turbine 210 may not meet during engine conditions where the engine is warmed-up (e.g., outside of a cold-start). Exhaust gas in the LP turbine 220 may flow into the exhaust passage 260 toward the aftertreatment device 262. The aftertreatment device 262 may be one or more of a selective catalytic reduction device, particulate filter, three-way catalyst, diesel oxidation catalyst, lean $NO_x$ trap, and a combination thereof.

Turning now to FIG. 3 a method for adjusting the first and second valves in response to at least an engine temperature is shown. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 may be described in reference to one or more components described above. Specifically, the method may be described in reference to HP turbine 210, LP turbine 220, LP turbine bypass 240, connecting passage 230, HP turbine outlet 214, LP turbine bypass 250, lean $NO_x$ trap 252, first valve 232, second valve 242, and exhaust passage 260 of FIG. 2.

The method 300 begins at 302 where the method includes determining engine operating conditions. Engine operating conditions may include but is not limited to one or more of engine speed, engine temperature, vehicle speed, manifold vacuum, exhaust gas recirculation flow rate, exhaust mass flow rate, boost pressure, and air/fuel ratio.

The method may proceed to 304, where the method includes determining if an engine temperature is less than a threshold temperature. In one example, the threshold temperature is substantially equal to a desired engine operating temperature (e.g., warmed-up temperature). Thus, the threshold temperature may be equal to a temperature range equal to 180-210° F. The engine temperature may be determined via a temperature sensor configured to sense a temperature of one or more of engine oil, engine coolant, and the like. If the engine temperature is less than the threshold temperature, then the method may proceed to 306. In some examples, the threshold temperature may be based on a light-off temperature of an aftertreatment device arranged in the exhaust passage (e.g., aftertreatment device 262 of FIG. 2A). Thus, if the aftertreatment device is not lit-off, then the method may proceed to 306.

At 306, the method may include closing the first valve and closing the second valve to fully closed positions. At 308, the method may include flowing exhaust gas through the HP turbine and the cold-start lean $NO_x$ trap. At 310, the method may include not flowing exhaust gas to the LP turbine. In this way, the cold-start may include flowing all the exhaust gas in the exhaust manifold to the HP-turbine, where the path of the exhaust gas from the exhaust manifold to the HP turbine is completely insulated. Exhaust gas from the HP turbine flows through the HP turbine outlet, where the exhaust gas flows through the first valve and into the cold-start lean $NO_x$ trap (e.g., lean $NO_x$ trap 252 of FIG. 2A). By doing this, zero exhaust gas flow to the LP turbine during the cold-start. Thus, the HP turbine bypass and the connecting passage are hermetically sealed due to the closed positions of the valves. Exhaust gas in the cold-start lean $NO_x$ trap may flow into a portion of the exhaust passage downstream of the LP turbine.

Returning to 304, if the engine temperature is not less than the threshold temperature and a cold-start is not occurring, then the method may proceed to 312 to open the first valve and open the second valve. At 314, the method may include flowing exhaust gas through the HP turbine and the LP turbine. In one example, the second valve may not be opened until the HP turbine can no longer provide a sufficient amount of boost to meet driver demand. At 316, the method may include not flowing exhaust gas through the lean $NO_x$ trap. Thus, once the engine is warmed-up, the cold-start lean $NO_x$ trap receives zero exhaust gas.

In some examples, the cold-start lean $NO_x$ trap may receive some exhaust gas once the engine has warmed-up to purge the lean $NO_x$ trap of $NO_x$ stored thereon. This may restore the trap to a less loaded state, where the less loaded state is configured to capture and store more $NO_x$ than a more loaded state. This may occur during lower driver demand operating conditions where a combination of the HP turbine and the LP turbine meet driver demand while allow a portion of exhaust gas to flow through the LP bypass passage to the cold-start lean $NO_x$ trap. The trap may release $NO_x$ stored thereon, where the $NO_x$ may be reduced at an aftertreatment device in the exhaust passage.

Turning now to FIG. 4, it shows an engine operating sequence 400 illustrating engine conditions through engine cold-start and engine warm-up conditions. Plot 410 shows an engine temperature and dashed line 412 shows a threshold engine temperature, plot 420 shows a first valve position, plot 430 shows a second valve position, plot 440 shows a HP turbine speed and dashed line 442 shows a threshold HP turbine speed, plot 450 shows a LP turbine speed, and plot 460 shows a cold-start lean $NO_x$ trap temperature and dashed line 462 shows a cold-start lean $NO_x$ trap light-off temperature. The threshold engine temperature is based on a desired engine operating temperature and temperatures below this temperature correspond to a cold-start. The threshold HP turbine speed is based on a turbine speed where operation of the HP turbine may no longer be stable. For example, turbine degradation, power loss, and power efficiency may decrease at turbine speeds greater than the threshold HP turbine speed. The cold-start lean $NO_x$ trap light-off temperature is based on a temperature where the cold-start lean $NO_x$ trap is hot enough to store $NO_x$ in an exhaust gas flow. Time increases from a left to right side of the figure.

Prior to $t_1$, the engine temperature (plot 410) increases from a relatively low temperature toward the threshold engine temperature. Thus, the engine may be undergoing a cold-start. In one example, the cold-start may occur due to an engine temperature decreasing following an amount of time remaining inactive (e.g., off). In response to the cold-start, the first valve (plot 420) is moved to a fully closed position. Additionally, the second valve (plot 430) is moved to the fully closed position. In this way, all the exhaust gas from the insulated exhaust manifold flows to the insulated HP turbine, where the exhaust gas flows through a HP turbine outlet and into the LP turbine bypass passage toward the cold-start lean $NO_x$ trap. As a result, the HP turbine speed (plot 440) increases toward the threshold HP turbine speed, while the LP turbine speed (plot 450) remains relatively low (e.g., zero). The cold-start lean $NO_x$ trap temperature (plot 460) increases to a temperature above the cold-start lean $NO_x$ trap light-off temperature (plot 462) relatively quickly and is capable of capturing $NO_x$ from the exhaust gas flow for a majority of the cold-start. As shown, the cold-start lean $NO_x$ trap temperature reaches the cold-start lean $NO_x$ trap light-off temperature before the cold-start is complete.

At $t_1$, the engine temperature is greater than the threshold engine temperature and the cold-start is complete. As a result, the first valve is moved to a fully open position and the second valve is moved to a more open position. When the first valve is in the fully open position, exhaust gas flowing from the HP turbine outlet flows into a connecting passage toward the LP turbine. Thus, the HP turbine outlet no longer feeds exhaust gas to the LP turbine bypass. As such, the cold-start lean $NO_x$ trap no longer receives exhaust gas and its temperature begins to decrease. The second valve allows exhaust gas to flow from the exhaust manifold into the HP turbine bypass toward the LP turbine without flowing through the HP turbine. In this way, once the cold-start is completed, some exhaust gas may bypass the HP turbine. In some examples, additionally or alternatively, exhaust gas may only bypass the HP turbine following the cold-start if the HP turbine is unable to meet a driver demand without assistance from the LP turbine. As shown the HP turbine speed is substantially equal to the threshold HP turbine speed and as a result, the HP turbine may no longer meet a current driver demand. Thus, the second valve is moved to a more open position to allow some exhaust gas to bypass the HP turbine and flow to the LP turbine.

The closed and open positions illustrated on the engine operating sequence correspond to fully closed and fully open positions, respectively. Thus, positions therebetween correspond to either more open or more closed positions depending on a directionality of the valve. For example, adjusting a valve from the fully closed position to a position between fully closed and fully open (e.g., valve is 20% open) may be described as a more open position. Alternatively, adjusting a valve from the fully open position to a position between fully open and fully closed (e.g., valve is 80% open) may be described as a more closed position. However, it will be appreciated that a valve 80% open is more open than a 20% open valve.

After $t_1$ and prior to $t_2$, the engine temperature remains above the threshold engine temperature. The first valve remains in the fully open position. As a result, the cold-start lean $NO_x$ trap temperature decreases to a temperature less than the cold-start lean $NO_x$ trap light-off temperature. The HP turbine speed decreases below the threshold turbine speed due to the second valve being in a more open position. This also results in the LP turbine speed increasing toward a relatively high speed. Driver demand increases between $t_1$ and $t_2$, resulting in the HP turbine speed to increase toward the threshold HP turbine speed. At $t_2$, the HP turbine speed is substantially equal to the threshold HP turbine speed. As a result, the second valve adjusted to a more open position to flow more exhaust gas from the exhaust manifold, through the HP turbine bypass, and to the LP turbine.

After $t_2$ and prior to $t_3$, the LP turbine speed increases and the HP turbine speed decreases as more exhaust gas is bypassed away from the HP turbine to the LP turbine. The first valve remains closed and the cold-start lean $NO_x$ trap temperature remains relatively low. At $t_3$, the HP turbine speed remains below the threshold HP turbine speed. The engine temperature remains greater than the threshold engine temperature. The LP turbine speed is between relatively high and low speeds.

In some example, the first valve may be adjusted to a more closed position following $t_3$ (e.g., after the cold-start) to allow a portion of exhaust gas to flow to the cold-start lean $NO_x$ trap. This may increase a temperature of the cold-start lean $NO_x$ trap to a relatively high temperature, where the trap may release $NO_x$ stored thereon. This may be based on a timer, where the first valve is slightly opened so as not to disrupt engine operating parameters (e.g., driver demand still met) while also flowing a sufficient amount of exhaust gas to the cold-start lean $NO_x$ trap to remove $NO_x$ stored thereon. The released $NO_x$ may be reduced at an aftertreatment device arranged in an exhaust passage coupled to the LP turbine bypass.

In one example, to regenerate the cold-start lean $NO_x$ trap, exhaust gas may be directed to the LP turbine bypass during light engine loads and/or low speed operations. Specifically, the cold-start lean $NO_x$ trap may be regenerated when exhaust gas temperatures are at or above a desired engine temperature (e.g., 200° C.) and engine load and/or driver demand may be met by the HP turbine. Additionally or alternatively, during light loads where light-out conditions may be met, the cold-start lean $NO_x$ trap may be used. Light-out conditions may be defined as lower/lighter engine loads where exhaust gas flow to the aftertreatment device (e.g., aftertreatment device 262) is insufficient to maintain the aftertreatment device lit-off. If this is the case and the HP turbine is capable of maintaining the lower load, then exhaust gas may flow to the cold-start lean $NO_x$ trap. Thus, the cold-start lean $NO_x$ trap may be used during a first mode where a cold-start is occurring and in a second mode, where the cold-start is not occurring.

As an example for a vehicle operating at a temperature substantially equal to a desired engine temperature, light-off conditions may be met if exhaust gas flow to an aftertreatment device is infrequent. This may occur during city driving or other similar driving environments wherein frequent stops may occur. If light-off conditions are met, then exhaust gas may flow to the cold-start lean $NO_x$ trap to ensure emissions are captured.

In this way, a two-stage turbocharger may comprise a HP turbine arranged in an engine head and close-coupled to an integrated exhaust manifold and a LP turbine coupled to an outside of an engine block. The HP turbine housing and the integrated exhaust manifold are insulated via an air-gap or other insulating element to mitigate thermal losses as exhaust gas flows through the head and into various exhaust passages. The technical effect of insulating the exhaust manifold and HP turbine is to mitigate heat losses so that exhaust gas may rapidly heat a cold-start lean $NO_x$ trap arranged downstream of the HP turbine. The cold-start further includes not flowing exhaust gas to the LP turbine until the cold-start is complete. Following completion of the cold-start, exhaust gases may flow to both the HP and LP turbines without flowing to the cold-start lean $NO_x$ trap.

An embodiment of a method comprising flowing exhaust through only insulated portions of an exhaust manifold and high-pressure turbine arranged in a cylinder head in response to an engine temperature being less than a threshold temperature, the exhaust flowing to a catalyst without flowing to a low-pressure turbine and flowing exhaust through insulated and uninsulated portions of the exhaust manifold to the high-pressure turbine and a low-pressure turbine when the engine temperature is greater than the threshold temperature. A first example of the method further comprises where the catalyst is a cold-start lean $NO_x$ trap, and where the cold-start lean $NO_x$ trap only receives exhaust gas when the engine temperature is less than the threshold temperature. A second example of the method, optionally including the first example, further includes where the catalyst is arranged in a low-pressure turbine bypass, and where exhaust flowing out of the catalyst does not flow to the low-pressure turbine bypass. A third example of the method, optionally including the first and/or second examples, further includes where the low-pressure turbine is bolted to a cylinder block, and where passages leading from the exhaust manifold to the low-pressure turbine are not insulated and are vertically lower than insulated passages leading from the exhaust manifold to the high-pressure turbine.

An embodiment of a system comprising an engine having a cylinder head and a cylinder block, a turbocharger having a high-pressure turbine and a low-pressure turbine, an exhaust gas manifold and the high-pressure turbine being arranged in the cylinder head, and where the exhaust gas manifold and the high-pressure turbine are insulated within the head, and where the exhaust gas manifold is fluidly connected to the low-pressure turbine via a high-pressure turbine bypass, the high-pressure turbine bypass passage is not insulated, and a controller with computer-readable instructions that when executed enable the controller to actuate a first valve to prevent exhaust gas from flowing from the high-pressure turbine to the low-pressure turbine and actuate a second valve to prevent exhaust gas from flowing from the exhaust manifold to the high-pressure turbine bypass during a first mode and actuate the first valve to flow exhaust gas from the high-pressure turbine to the low-pressure turbine and actuate the second valve to flow exhaust gas from the exhaust manifold to the high-pressure turbine bypass during a second mode. A first example of the system further comprises where the first mode further comprises flowing exhaust gas to a cold-start lean $NO_x$ trap arranged in a low-pressure turbine bypass downstream of the first valve. A second example of the system, optionally including the first example, further includes where the second mode further comprises bypassing exhaust gas around the low-pressure turbine and flowing exhaust gas to the cold-start lean $NO_x$ trap when light-out conditions of an aftertreatment device are met.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged, direct-injection internal combustion engine having an intake system for supply of charge air and having an exhaust-gas discharge system for discharge of exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage comprising a first compressor and a first turbine, and a second exhaust-gas turbocharger serves as a high-pressure stage including a second compressor and a second turbine, which comprises a second turbine housing, of the second exhaust-gas turbocharger being arranged upstream of the first turbine, which comprises a first turbine housing, of the first exhaust-gas turbocharger, and the second compressor of the second exhaust-gas turbocharger being arranged downstream of the first compressor of the first exhaust-gas turbocharger, wherein the first turbine housing of the first turbine is fastened to a cylinder block of the internal combustion engine, and where at least one connection between the first turbine housing of the first turbine and an exhaust-gas-conducting line is formed using vibration-damping elements;
- a first bypass line being provided which branches off from the exhaust-gas discharge system between the first turbine and the second turbine so as to form a first junction point;
- a valve being arranged in the exhaust-gas discharge system at the first junction point;
- a second bypass line being provided which branches off from the exhaust-gas discharge system upstream of the second turbine and which opens into the exhaust-gas discharge system again between the first turbine and the second turbine and in which there is arranged a shut-off element;
- at least one exhaust-gas aftertreatment system being provided in the exhaust-gas discharge system downstream of the first turbine and the second turbine; and
- a nitrogen oxide storage catalytic converter arranged in the first bypass line.

2. The supercharged, direct-injection internal combustion engine of claim 1, wherein the valve at the first junction point is a three-way valve.

3. The supercharged, direct-injection internal combustion engine of claim 1, wherein the valve at the first junction point is a pivotable flap.

4. The supercharged, direct-injection internal combustion engine of claim 1, wherein the first bypass line opens into the exhaust-gas discharge system downstream of the first turbine and upstream of the at least one exhaust-gas aftertreatment system provided in the exhaust-gas discharge system.

5. The supercharged, direct-injection internal combustion engine of claim 1, wherein the nitrogen oxide storage catalytic converter arranged in the first bypass line receives exhaust gas when an engine temperature is less than a threshold temperature.

6. The supercharged, direct-injection internal combustion engine of claim 1, wherein the second bypass line bypasses exhaust gas around the second turbine.

7. The supercharged, direct-injection internal combustion engine of claim 1, further comprising a charge-air cooler arranged in the intake system between the first compressor and the second compressor.

8. The supercharged, direct-injection internal combustion engine of claim 1, the internal combustion engine comprising at least two cylinders, in which each cylinder comprises at least one outlet opening for discharge of the exhaust gases via the exhaust-gas discharge system, and each outlet opening is adjoined by an exhaust line, wherein the exhaust lines of at least two cylinders merge to form an exhaust manifold.

9. The supercharged, direct-injection internal combustion engine of claim 8, wherein the exhaust manifold is at least partially equipped with thermal insulation, and wherein the thermal insulation comprises at least one air cushion situated in a cavity.

10. The supercharged, direct-injection internal combustion engine of claim 9, wherein the turbine housing of the second turbine is at least partially formed integrally with the exhaust manifold.

11. The supercharged, direct-injection internal combustion engine of claim 1, further comprising a controller with computer-readable instructions stored thereon that when executed enable the controller to initiate a first mode where the internal combustion engine is supercharged using only the second exhaust-gas turbocharger when the engine temperature is less than a threshold temperature, and to initiate a second mode where the internal combustion engine is supercharged via the first exhaust-gas turbocharger and the second exhaust-gas turbocharger when the engine temperature is greater than the threshold temperature, where the threshold temperature is equal to a desired engine operating temperature.

12. The supercharged, direct-injection internal combustion engine of claim 11, wherein the first mode further comprises actuating the valve arranged at the first junction point to open the first bypass line and prevent exhaust gas flow to the first turbine from the second turbine.

13. A method comprising:
- flowing exhaust through only insulated portions of an exhaust manifold and a high-pressure turbine arranged in a cylinder head in response to an engine temperature being less than a threshold temperature, the exhaust flowing to a catalyst without flowing to a low-pressure turbine; and
- flowing exhaust through uninsulated portions of the exhaust manifold to the low-pressure turbine when the engine temperature is greater than the threshold temperature.

14. The method of claim 13, wherein the catalyst is a cold-start lean $NO_x$ trap, and wherein the cold-start lean $NO_x$ trap receives exhaust gas only when the engine temperature is less than the threshold temperature.

15. The method of claim 13, wherein the catalyst is arranged in a low-pressure turbine bypass, and wherein exhaust flowing out of the catalyst does not flow to the low-pressure turbine bypass.

16. The method of claim 13, wherein the low-pressure turbine is bolted to a cylinder block, and wherein passages leading from the exhaust manifold to the low-pressure turbine are not insulated and are vertically lower than insulated passages leading from the exhaust manifold to the high-pressure turbine.

17. A system comprising:
- an engine having a cylinder head and a cylinder block;
- a turbocharger having a high-pressure turbine and a low-pressure turbine;
- an exhaust gas manifold and the high-pressure turbine being arranged in the cylinder head, wherein the exhaust gas manifold and the high-pressure turbine are insulated within the cylinder head, and wherein the exhaust gas manifold is fluidly connected to the low-pressure turbine via a high-pressure turbine bypass, the high-pressure turbine bypass passage is not insulated; and a controller with computer-readable instructions that when executed enable the controller to:
actuate a first valve to prevent exhaust gas from flowing from the high-pressure turbine to the low-pressure turbine and actuate a second valve to prevent exhaust gas from flowing from the exhaust manifold to the high-pressure turbine bypass during a first mode and actuate the first valve to flow exhaust gas from the high-pressure turbine to the low-pressure turbine and actuate the second valve to flow exhaust gas from the exhaust manifold to the high-pressure turbine bypass during a second mode.

18. The system of claim 17, wherein the first mode further comprises flowing exhaust gas to a cold-start lean $NO_x$ trap arranged in a low-pressure turbine bypass downstream of the first valve.

19. The system of claim 17, wherein the second mode further comprises bypassing exhaust gas around the low-pressure turbine and flowing exhaust gas to the cold-start lean $NO_x$ trap when light-out conditions of an aftertreatment device are met.

\* \* \* \* \*